US012674941B2

(12) United States Patent
Leone et al.

(10) Patent No.: US 12,674,941 B2
(45) Date of Patent: Jul. 7, 2026

(54) OPTICAL FERRULE ASSEMBLY AND OPTICAL ADHESIVE FORMULATION

(71) Applicant: 3M INNOVATIVE PROPERTIES COMPANY, St. Paul, MN (US)

(72) Inventors: Amanda K. Leone, St. Paul, MN (US); David B. Stegall, St. Paul, MN (US); Changbao Ma, Austin, TX (US); Bing Hao, Woodbury, MN (US); Barry J. Koch, Menomonie, WI (US); Constantin-Christian A. Voll, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 608 days.

(21) Appl. No.: 18/306,296

(22) Filed: Apr. 25, 2023

(65) Prior Publication Data

US 2023/0367083 A1     Nov. 16, 2023

Related U.S. Application Data

(60) Provisional application No. 63/341,774, filed on May 13, 2022.

(51) Int. Cl.
*G02B 6/38* (2006.01)
*C09J 133/10* (2006.01)
*C09J 175/04* (2006.01)

(52) U.S. Cl.
CPC .......... *G02B 6/3861* (2013.01); *C09J 133/10* (2013.01); *C09J 175/04* (2013.01); *G02B 6/3813* (2013.01); *C09J 2301/312* (2020.08); *C09J 2301/408* (2020.08); *C09J 2301/416* (2020.08)

(58) Field of Classification Search
CPC .. G02B 6/3861; G02B 6/3813; G02B 6/3885; C09J 133/10; C09J 175/14; C09J 175/04
See application file for complete search history.

(56) References Cited

U.S. PATENT DOCUMENTS

| | | | |
|---|---|---|---|
| 5,219,896 A | 6/1993 | Coady et al. | |
| 5,481,632 A * | 1/1996 | Hirai ........................ | G02B 6/30 385/80 |
| 6,470,128 B1 | 10/2002 | Khudyakov et al. | |
| 9,791,635 B2 | 10/2017 | Richmond et al. | |

(Continued)

FOREIGN PATENT DOCUMENTS

CA          2082614 A1     10/1993

*Primary Examiner* — Michael P Mooney
(74) *Attorney, Agent, or Firm* — Clifton F. Richardson

(57) ABSTRACT

An optical ferrule assembly includes an optical ferrule including an attachment area, a light input surface and a light output surface; an optical fiber having a fiber end where the light input surface and the fiber end defines a gap therebetween substantially filled with an adhesive, such that light propagating along the optical fiber and having a peak intensity $I1 \geq 3$ GW/m², exits the fiber end and enters the optical ferrule through the light input surface after traversing the gap through the adhesive, and exits the optical ferrule through the light output surface. The exiting light has a first beam size, such that after at least 100 hours of aging of the optical ferrule assembly, any change in the first beam size due to a photodegradation of the adhesive is no more than about 10%. The adhesive can be prepared by photocuring an optical adhesive formulation.

19 Claims, 9 Drawing Sheets

(56)             References Cited

U.S. PATENT DOCUMENTS

| | | | |
|---|---|---|---|
| 10,746,942 | B2 | 8/2020 | Haase et al. |
| 11,029,472 | B2 | 6/2021 | Hayauchi et al. |
| 11,163,122 | B2 | 11/2021 | Haase et al. |
| 11,307,362 | B2 | 4/2022 | Haase et al. |

* cited by examiner

OPTICAL FERRULE ASSEMBLY AND OPTICAL ADHESIVE FORMULATION

CROSS REFERENCE TO RELATED APPLICATION

This application claims the benefit of U.S. Application No. 63/341,774, filed May 13, 2022, the disclosure of which is incorporated by reference in its entirety herein.

SUMMARY

In some aspects, the present description provides an optical ferrule assembly including an optical ferrule including an attachment area and a light coupling portion including a light input surface and a light output surface; an optical fiber secured to the attachment area and having a fiber end where the light input surface and the fiber end defines a gap therebetween; and a photocured optical adhesive substantially filling the gap and adhering to the light input surface and the fiber end, such that light propagating along the optical fiber and having a peak intensity $I1 \geq 3$ $GW/m^2$, exits the fiber end and enters the light coupling portion of the optical ferrule through the light input surface after traversing the gap through the photocured optical adhesive, and exits the optical ferrule through the light output surface after traversing the light coupling portion. The exiting light has a first beam size along a first lateral direction at a first location from the light output surface, such that at least for a wavelength of about 1270 nm and after at least 100 hours of aging of the optical ferrule assembly at a temperature of at least 20 degrees C., any change in the first beam size of the exiting light at the first location due to a photodegradation of the photocured optical adhesive is no more than about 10%.

In some aspects, the present description provides an optical ferrule assembly including an optical ferrule including an attachment area and a light coupling portion including a light input surface and a light output surface; an optical fiber secured to the attachment area and having a fiber end where the light input surface and the fiber end defines a gap therebetween; and a photocured optical adhesive substantially filling the gap and adhering to the light input surface and the fiber end, such that light propagating along the optical fiber and having a peak intensity $I1 \geq 3$ $GW/m^2$, exits the fiber end and enters the light coupling portion of the optical ferrule through the light input surface after traversing the gap through the photocured optical adhesive, and exits the optical ferrule through the light output surface after traversing the light coupling portion. The exiting light has a peak intensity I2, such that at least for a wavelength of about 1270 nm and after at least 100 hours of aging of the optical ferrule assembly at a temperature of at least 20 degrees C., any change in I2 due to a photodegradation of the photocured optical adhesive is no more than about 25%.

In some aspects, the present description provides an optical ferrule assembly including an optical ferrule including an attachment area and a light input surface; an optical fiber secured to the attachment area and having a fiber end where the light input surface and the fiber end defines a gap therebetween; and a photocured optical adhesive substantially filling the gap and adhering to the light input surface and the fiber end. When the optical ferrule assembly mates with a mating optical ferrule assembly that includes a mating optical fiber attached to a mating attachment area and the photocured optical adhesive substantially filling a mating gap between a mating fiber end of the mating optical fiber and a mating light input surface and adhering to the mating light input surface and the mating fiber end to form a mated optical assembly, and when light propagating along the optical fiber has a peak intensity $I1 \geq 0.35$ $GW/m^2$ and at least a wavelength in a range of about 850 nm to about 1350 nm, the mated optical assembly has a first insertion loss, and after at least 600 hours of aging of the mated optical assembly at a temperature of at least 40 degrees C., the mated optical assembly has a second insertion loss different from the first insertion loss by no more than about 0.3 dB.

In some aspects, the present description provides an optical ferrule assembly including an optical ferrule including an attachment area and a light input surface; an optical fiber secured to the attachment area and having a fiber end where the light input surface and the fiber end defines a gap therebetween; and a photocured optical adhesive substantially filling the gap and adhering to the light input surface and the fiber end. When the optical ferrule assembly mates with a mating optical ferrule assembly that includes a mating optical fiber attached to a mating attachment area and the photocured optical adhesive substantially filling a mating gap between a mating fiber end of the mating optical fiber and a mating light input surface and adhering to the mating light input surface and the mating fiber end to form a mated optical assembly, and when light propagating along the optical fiber has a peak intensity $I1 \geq 1$ $GW/m^2$ and at least a wavelength in a range of about 850 nm to about 1350 nm, the mated optical assembly has a first insertion loss, and after at least 380 hours of aging of the mated optical assembly at a temperature of at least 20 degrees C., the mated optical assembly has a second insertion loss different from the first insertion loss by no more than 0.08 dB.

In some aspects, the present description provides a photocurable optical adhesive formulation comprising: one or more (meth)acrylate monomers or oligomers; one or more photoinitiators at 1.5 to 7 weight percent based on a total weight of the adhesive formulation; and one or more aliphatic urethane (meth)acrylate crosslinkers at 25 to 65 weight percent based on the total weight of the adhesive formulation. When the adhesive formulation is substantially fully cured to form a photocured optical adhesive layer comprising a urethane (meth)acrylate polymer and having an average thickness of about 80 micrometers between opposing first and second major surfaces of the photocured optical adhesive layer, at least 98% of all non-aromatic carbon-carbon bonds of the urethane (meth)acrylate polymer are single bonds. When a light propagating along an optical fiber and having a peak intensity I1 of about 6 $GW/m^2$ exits a fiber end of the optical fiber in contact with the first major surface of the photocured optical adhesive layer such that the light is transmitted through the first and second major surfaces of the photocured optical adhesive layer, the transmitted light has a first beam size along a first lateral direction at a first location. At least for a wavelength of about 1270 nm, after at least 100 hours of the light being transmitted through the photocured optical adhesive layer, any change in the first beam size of the transmitted light at the first location due to a photodegradation of the photocured optical adhesive layer is no more than about 10%, and a linear least squares fit of a plot of the first beam size of the transmitted light at the first location versus time for the at least 100 hours of the light being transmitted through the photocured optical adhesive layer has a coefficient of determination $R^2$ of at least 0.85.

These and other aspects will be apparent from the following detailed description. In no event, however, should this brief summary be construed to limit the claimable subject matter.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

According to some embodiments of the present description, an optical ferrule assembly is provided where an optical adhesive disposed between a fiber end of an optical fiber and a light input surface of an optical ferrule is such that any photodegradation of the optical adhesive during operation of the optical ferrule (e.g., with O-band light) causes little or substantially no change in predetermined optical properties of the optical ferrule assembly. According to some embodiments, an optical adhesive is provided for adhering an end of an optical fiber to a light input surface of an optical ferrule, where any photodegradation of the optical adhesive during operation of the optical ferrule (e.g., with O-band light) causes little or substantially no change in one or more of a peak intensity of light exiting the optical ferrule, a beam waist of light exiting the optical ferrule, a beam mode of light exiting the optical ferrule, or an insertion loss when the optical ferrule is mated with a mating optical ferrule to form a mated optical assembly. According to some embodiments, the optical adhesive can be provided by photocuring an optical adhesive formulation described herein. In some embodiments, substantially all (e.g., at least 98%, 98.5, 99, or 99.5% by number or mole) non-aromatic carbon-carbon bonds of the polymer of the optical adhesive are carbon-carbon single bonds. It has been found that substantially eliminating double bonds, other than in aromatic rings, results in improved photostability of the adhesive. The optical adhesive can be a photocured optical adhesive which, in some embodiments, comprises a urethane (meth) acrylate polymer (e.g., a polymer obtained from polymerizing urethane di(meth)acrylate and (meth)acrylate monomers). Other useful optical adhesives are described further elsewhere herein. In some embodiments, at least 98%, or at least 98.5%, or at least 99%, or at least 99.5% of all non-aromatic carbon-carbon bonds of the urethane (meth) acrylate polymer are single bonds.

Figure 1:
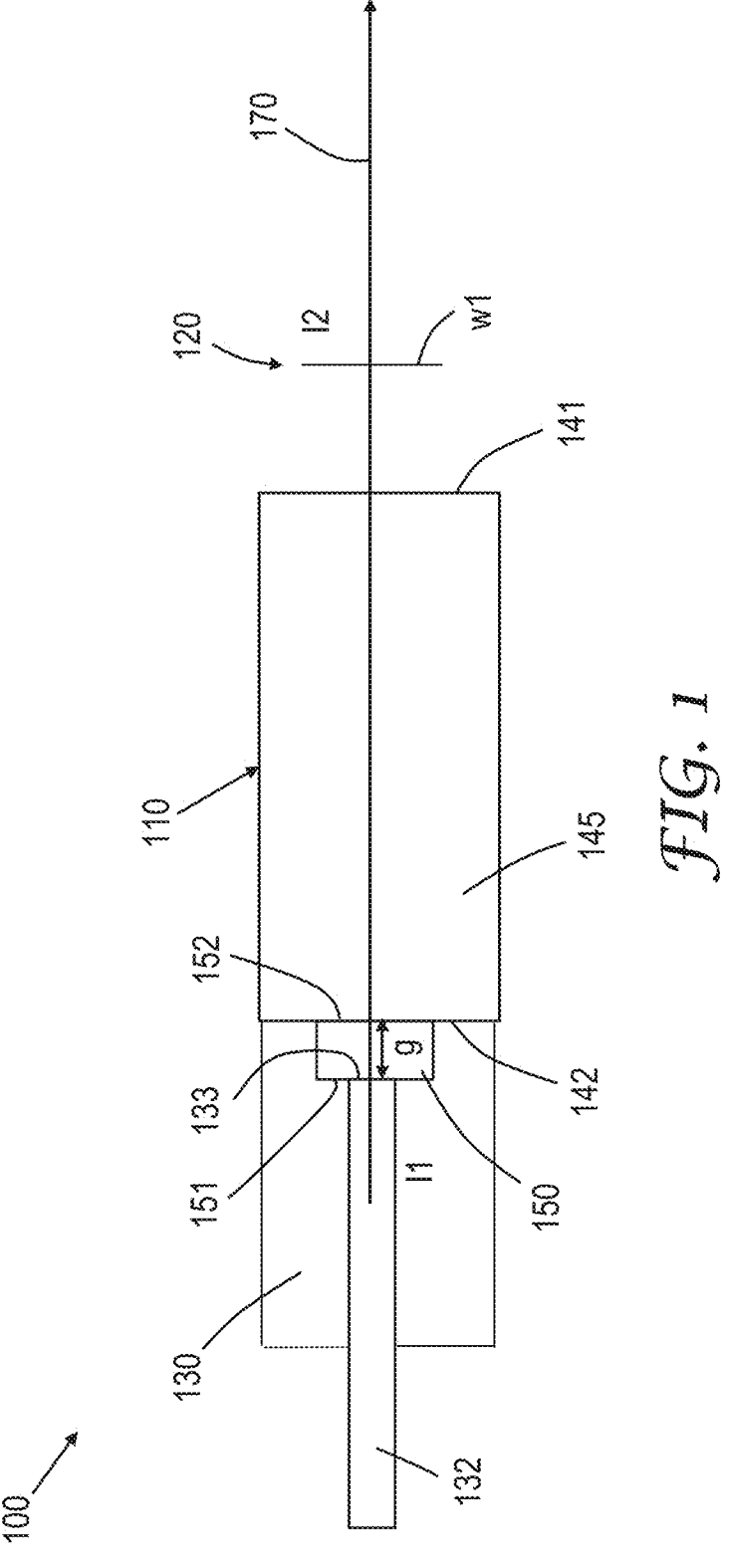
FIGS. 1-2 are schematic top views of optical ferrule assemblies, according to some embodiments.

FIG. 1 is a schematic top view of an optical ferrule assembly 100, according to some embodiments. The optical ferrule assembly 100 includes an optical ferrule 110 including an attachment area 130 and a light input surface 142. The optical ferrule can include a light coupling portion 145 including the light input surface 142 and including a light output surface 141. The optical ferrule assembly 100 includes an optical fiber 132 secured to the attachment area 130 that has a fiber end 133. The light input surface and the fiber end define a gap g therebetween. The optical ferrule assembly 100 includes a photocured optical adhesive 150 substantially filling the gap g (e.g., filing at least the optical path of a central ray propagating between the fiber end and the light input surface and/or filling greater than 50, 60, 70, 90, 95, or 99 percent of a volume between the fiber end and the light input surface) and adhering to the light input surface 142 and the fiber end 133. The optical adhesive may also be used as a moisture barrier or sealant (e.g., to seal the fiber end of the optical fiber). The optical adhesive can sufficiently fill the gap so that substantially all of the light exiting the fiber end is transmitted through the optical adhesive to the light input surface. In some embodiments, the gap g is in a range of about 40 to about 120 micrometers, about 50 to about 110 micrometers, about 60 to about 100 micrometers, or about 70 to about 90 micrometers. For example, the gap g can be about 80 micrometers. Typically, a gap of at least about 40 micrometers provides sufficient adhesive bonding strength while a gap of no more than about 120 micrometers may be desired to reduce any optical artifacts of the adhesive.

Figure 2:
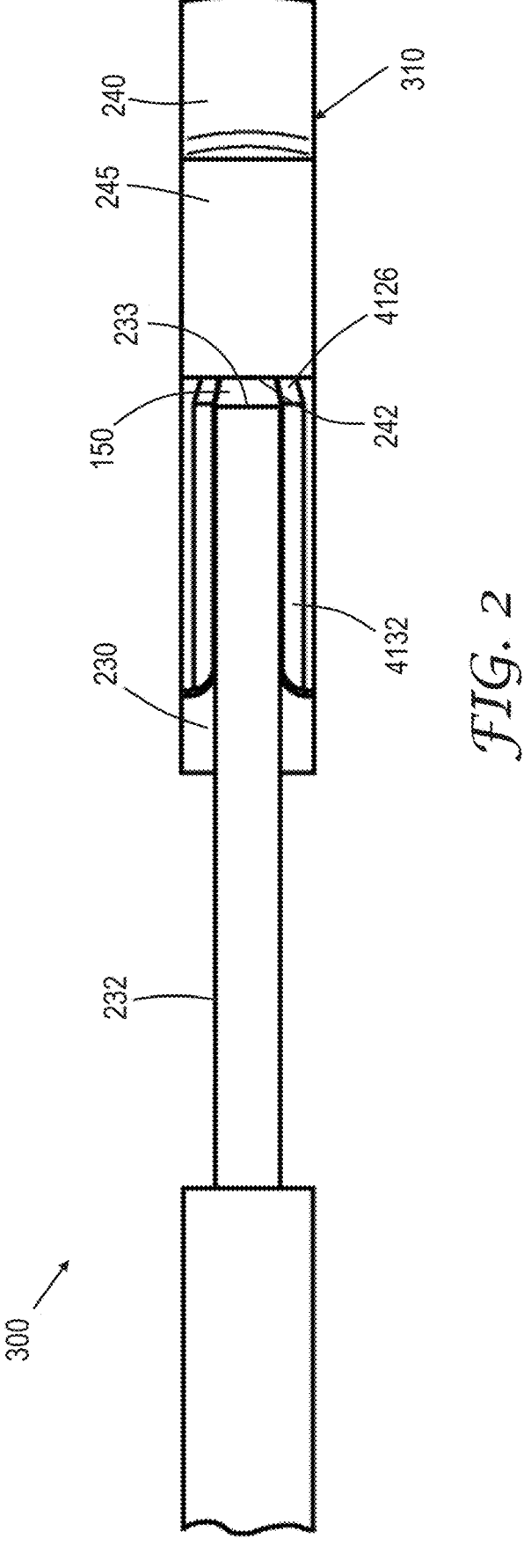
Figure 3:
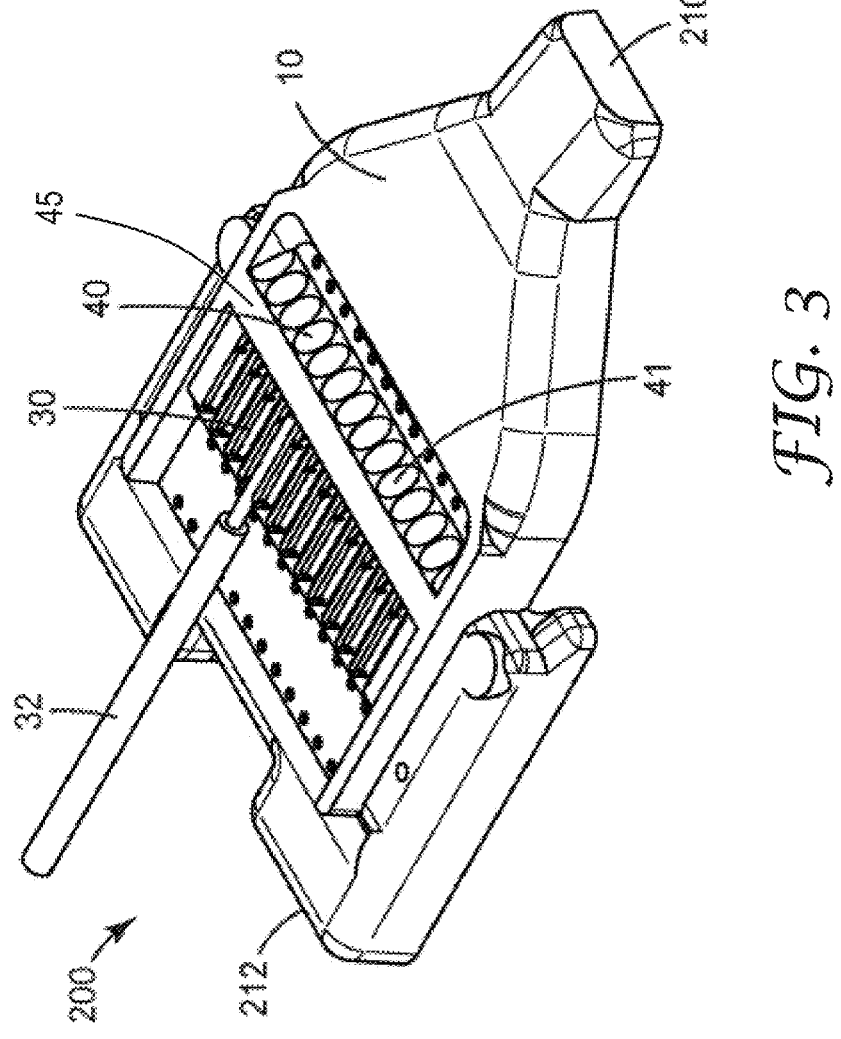
FIG. 3 is a schematic top perspective view of an optical assembly, according to some embodiments.

The optical ferrule 110 can be any suitable type of optical ferrule. In some embodiments, the optical ferrule 110 is configured as having a multi-fiber push-on (MPO) format or other standard format (e.g., MT, MP, ST, FC, or LC formats). In some embodiments, the optical ferrule 110 is an expanded beam optical ferrule. Useful optical ferrules are described in U.S. Pat. No. 9,791,635 (Richmond et al.); U.S. Pat. No. 10,746,942 (Haase et al.); U.S. Pat. No. 11,029,472 (Hayauchi et al.); U.S. Pat. No. 11,163,122 (Haase et al.); and U.S. Pat. No. 11,307,362 (Haase et al.), for example. The optical ferrule may be made by injection molding a suitable moldable polymer as described in U.S. Pat. No. 10,746,942 (Haase et al.), for example. FIGS. 2-3 schematically illustrate exemplary, non-limiting, optical ferrule configurations, according to some embodiments.

FIG. 2 is a schematic top view of an optical ferrule assembly 300, according to some embodiments. The optical ferrule assembly 300 includes an optical ferrule 310 including an attachment area 230 and a light coupling portion 245 including a light input surface 242 and a light output surface (portion of bottom surface of the optical ferrule 310), and an optical fiber 232 secured to the attachment area 230 and having a fiber end 233. In some embodiments, the light input surface 242 and the fiber end 233 define a gap therebetween, and a photocured optical adhesive 150 substantially fills the gap and adheres to the light input surface 242 and the fiber end 233. In some embodiments, the optical ferrule includes an adhesive reservoir (a waveguide inaccessible space) that defines the gap substantially filled by the adhesive 150. In some embodiments, the optical ferrule 310 includes a light redirecting surface 240. In some embodiments, the optical ferrule includes groove sidewalls 4132 and centering sidewalls 4126 which can center the optical fiber 310 in a groove of the attachment area 230 when the optical fiber 310 is inserted into the groove. Related optical ferrules are described in U.S. Pat. No. 11,307,362 (Haase et al.), for example. The optical ferrule 310 can optionally be configured to receive a plurality of the optical fibers 232 (see, e.g., FIG. 3).

FIG. 3 is a schematic top perspective view of an optical ferrule assembly 200, according to some embodiments. The optical ferrule assembly 200 includes an optical ferrule 10 including an attachment area 30 and a light coupling portion 45 including a light input surface and a light output surface (portion of bottom surface of the optical ferrule 10), and an optical fiber 32 secured to the attachment area 30 and having a fiber end. In some embodiments, the light input surface and the fiber end define a gap therebetween, and a photocured optical adhesive substantially fills the gap and adheres to the light input surface and the fiber end. In some embodiments, the attachment area 30 includes one or more grooves for receiving one or more waveguides (e.g., a plurality of grooves for receiving a plurality of waveguides). In some embodiments, the optical ferrule 10 includes a light redirecting surface 40 which can include a plurality of curved surface portions 41 where each curved surface portion 41 is disposed to receive light from an optical waveguide received in a groove corresponding to the curved surface portion. The optical ferrule 10 has a leading end 210 and a trailing end 212. The leading end 210 is the end that approaches a mating ferrule during mating of the ferrule 10 with the mating ferrule. Related optical ferrules are described in U.S. Pat. No. 11,163,122 (Haase et al.), for example. The optical ferrule of FIG. 3 can include an adhesive reservoir between each of the optical fibers 32 and the corresponding light input surface as described in U.S. Pat. No. 11,307,362 (Haase et al.), for example.

Figure 4:
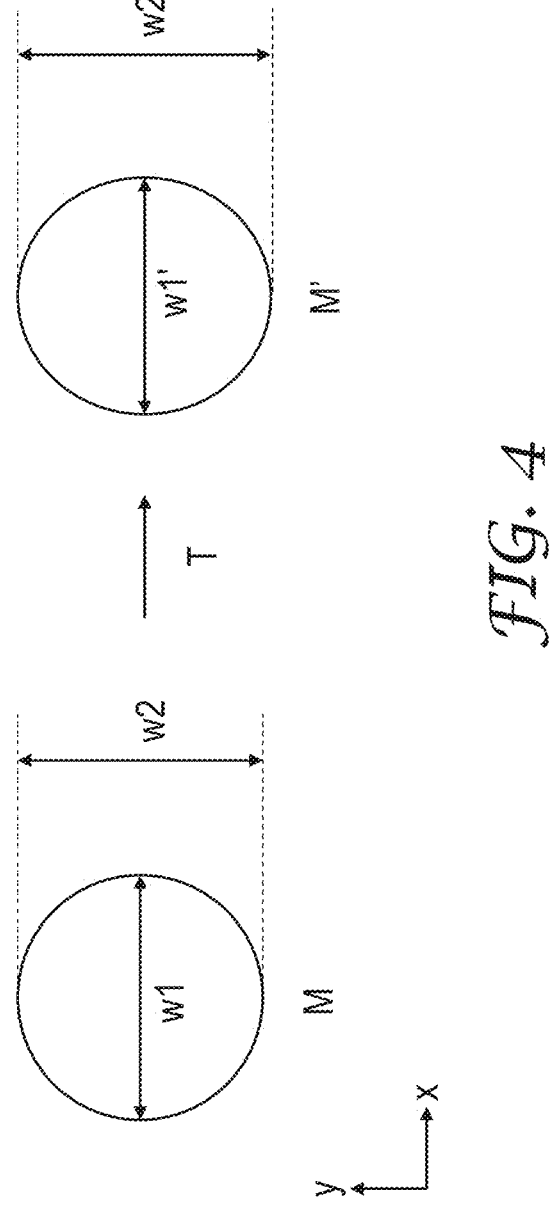
FIG. 4 schematically illustrates intensity distributions of light exiting an optical assembly before and after aging the optical assembly, according to some embodiments.

Light 170 exiting the optical ferrule can have a beam size w1 (e.g., beam waist) along a first lateral direction (a direction orthogonal to direction of light 170) at a first location 120 (see, e.g., FIG. 1) from the light output surface. FIG. 4 schematically illustrates beam size along orthogonal first and second directions (x- and y-directions) before and after aging the of the optical ferrule assembly 100, 200, 300 at a temperature T during operation of the optical assembly with a light 170 that can have a peak intensity $I1 \geq 0.35$, or 0.4, or 0.45, or, 0.5, or 0.55, or 0.6, or 0.65, or 0.7, or 0.75, or 0.8, or 0.9, or 1, or 1.25, or 1.5, or 1.75, or 2, or 2.25, or 2.5, or 3, or 3.5, or 4, or 4.5, or 5, or 5.5, or 6, or 6.5, or 7 $GW/m^2$ when propagating along the optical fiber 132, 32, 232, according to some embodiments. The peak intensity I1 can be up to 10, 9, 8, or 7.5 $GW/m^2$, for example. The light 170 can have a wavelength or wavelengths in a range of about 800 nm to about 1400 nm, or about 850 nm to about 1350 nm, or about 1250 nm to about 1330 nm, for example. In some embodiments, the light 170 can have a wavelength of about 850 nm, about 1270 nm, about 1290 nm, about 1310 nm, or about 1330 nm, for example. In some such embodiments, or in other embodiments, the light 170 can be monochromatic or substantially monochromatic (e.g., nominally monochromatic). The light 170 can be from an O-band laser, for example. The light can have a wavelength within 50, 30, 20, or 10 nm of the specified wavelength, for example (e.g., a wavelength of about 1270 nm can be a wavelength in a range of 1220 nm to 1310 nm). The light 170 has peak intensities I2 and I2' (the peak intensity typically occurs at or near a center of the light beam) before and after aging, respectively, after exiting the optical ferrule. Before aging, the output intensity has a first beam size w1 along a first lateral direction (x-direction) at a first location (e.g., corresponding to location 120 of FIG. 1) from the light output surface and a second beam size w2 along a second, orthogonal to the first, lateral direction (y-direction) at the first location from the light source. The second beam size w2 can be the same or different than the first beam size w1 (e.g., the beam spot can be circular with w1 and w2 equal or elliptical with w1 and w2 different). After aging the first and second beam sizes may shift to w1' and w2', respectively. The aging may be carried out at room temperature (e.g., about 23 degrees C.), or may be carried out at an elevated temperature (e.g., about 35 degrees C. or about 60 degrees C.) to mimic a hot environment or as a model to understand accelerated aging.

In some embodiments, it is desired that the beam size w1' be constant or, if the beam size changes, it smoothly varies with time during aging. For example, the beam size can change substantially monotonically with time (e.g., monotonic after averaging over data points to reduce noise). In some embodiments, for the at least the wavelength of about 1270 nm, a linear least squares fit (e.g., the linear least squares fit 479 illustrated in FIG. 8) of a plot of the first beam size of the exiting light at the first location versus aging time for the at least 100 hours of aging of the optical ferrule assembly at a temperature of at least 20 degrees C. has a coefficient of determination $R^2$ (e.g., the coefficient of determination 431 illustrated in FIG. 8) of at least 0.85, 0.88, 0.9, 0.91, or 0.92. It is typically desired that the slope is small. In some embodiments, a magnitude of the slope (e.g., the slope 432 illustrated in FIG. 8) of the linear least squares fit divided by the initial beam size is less than about $10^{-4}$ $min^{-1}$, or $5 \times 10^{-5}$ $min^{-1}$, or $3 \times 10^{-5}$ $min^{-1}$, or $2 \times 10^{-5}$ $min^{-1}$, or $1 \times 10^{-6}$ $min^{-1}$. In some embodiments, the variation in the size with time can be smoother when the slope is not zero. In some embodiments, the magnitude of the slope of the linear least squares fit divided by the initial beam size is greater than about $10^{-6}$ $min^{-1}$, or $3 \times 10^{-6}$ $min^{-1}$, or $5 \times 10^{-6}$ $min^{-1}$. In some cases, a desired stability in the beam size can be specified by a low change in the beam size at both a shorter aging time (e.g., 15 hours) and a longer aging time (e.g., at least 100 hours). For example, in some embodiments where for at least for the wavelength of about 1270 nm, any change in the first beam size of the exiting light at the first location due to a photodegradation of the photocured optical adhesive is less than 10% (or in another range described elsewhere herein) after at least 100 hours of aging of the optical ferrule assembly at a temperature of at least 20 degrees C., and for at least for the wavelength of about 1270 nm after 15 hours of aging of the optical ferrule assembly at a temperature of at least 20 degrees C., any change in the first beam size of the exiting light at the first location due to a photodegradation of the photocured optical adhesive is no more than about 3, 2, or 1%. The second beam size w2' and the intensity I2' can have linear least squares fits having coefficients of determination and/or slopes in any of the ranges described for w1'.

In some embodiments, at least for a wavelength of about 1270 nm and after at least 100 hours of aging of the optical ferrule assembly at a temperature of at least 20 degrees C., any change in I2 (e.g., $|I2'-I2|/I2 \times 100\%$) due to a photodegradation of the photocured optical adhesive is no more than about 25, 20, 15, 14, 13, 12, 11, or 10%. In some embodiments, the any change in I2 due to the photodegradation of the photocured optical adhesive comprises an increase in I2. In some embodiments, the any change in I2 due to the photodegradation of the photocured optical adhesive comprises a decrease in I2. In embodiments where the light beam is approximately Gaussian before and after aging, the change in I2 is approximately inversely proportional to the change in the square of the mode field diameter (MFD) of the exiting light at the first location 120 (see, e.g., FIG. 1).

In some embodiments, the optical ferrule assembly is such that at least for a wavelength of about 1270 nm and after at least 100 hours of aging of the optical ferrule assembly at a temperature of at least 20 degrees C., any change in the first beam size (e.g., $|w1'-w1|/w1\times100\%$) of the exiting light at the first location due to a photodegradation of the photocured optical adhesive is no more than about 10, 9, 8, 7, 6, or 5%. In some embodiments, the optical ferrule assembly is such that at least for a wavelength of about 1270 nm and after at least 100 hours of aging of the optical ferrule assembly at a temperature of at least 20 degrees C., any change in the second beam size (e.g., $|w2'-w2|/w2\times100\%$) of the exiting light at the first location due to a photodegradation of the photocured optical adhesive is no more than about 10, 9, 8, 7, 6, or 5%. In some embodiments, the any change in the first beam size of the exiting light at the first location due to the photodegradation of the photocured optical adhesive comprises a decrease in the first beam size. In some such embodiments, or in other embodiments, the any change in the second beam size of the exiting light at the first location due to the photodegradation of the photocured optical adhesive comprises a decrease in the second beam size. In some embodiments, the any change in the first beam size of the exiting light at the first location due to the photodegradation of the photocured optical adhesive comprises an increase in the first beam size. In some such embodiments, or in other embodiments, the any change in the second beam size of the exiting light at the first location due to the photodegradation of the photocured optical adhesive comprises an increase in the second beam size. In some embodiments, the any change in the second beam size of the exiting light at the first location due to the photodegradation of the photocured optical adhesive comprises an increase in the first beam size and a largest decrease in the first beam size is about 0% (e.g., the first beam size can increase over some times during ageing without decreasing over any time). In some embodiments, the any change in the first beam size of the exiting light at the first location due to the photodegradation of the photocured optical adhesive comprises a decrease in the first beam size and a largest increase in the first beam size is about 0% (e.g., the first beam size can decrease over some times during ageing without increasing over any time). In some embodiments, the any change in the second beam size of the exiting light at the first location due to the photodegradation of the photocured optical adhesive comprises an increase in the second beam size and a largest decrease in the second beam size is about 0% (e.g., the second beam size can increase over some times during ageing without decreasing over any time). In some embodiments, the any change in the second beam size of the exiting light at the first location due to the photodegradation of the photocured optical adhesive comprises a decrease in the second beam size and a largest increase in the second beam size is about 0% (e.g., the second beam size can decrease over some times during ageing without increasing over any time). In other embodiments, the beam size can increase for some times and decrease for other times. Any change in w2, I2, or the insertion loss described elsewhere herein can similarly be or include an increase, a decrease, or both.

The any change in a property (e.g., I2, w1, w2, or the insertion loss) due to a photodegradation of the photocured optical adhesive includes the maximum change over the aging time. For example, if the maximum w1' over the aging time is w1max and the initial first beam size is w1, (w1max−w1)/w1×100% can be in any of the ranges described elsewhere herein for the any change in the first beam size (e.g., no more than about 10%). In some cases, the property can increase and then decrease, or decrease then increase, over the aging of the optical ferrule assembly. In some embodiments, the percent difference between the maximum value of the property over the aging time and the minimum value of the property over the aging time is in any of the ranges specified for the percent change in the property. For example, in some embodiments where any change in I2 due to a photodegradation of the photocured optical adhesive is no more than about 25% after 100 hours of aging of the optical ferrule assembly, the maximum minus the minimum value of I2 over the aging may be no more than about 25% higher than the minimum value of I2. As another example, in some embodiments where any change in w1' due to a photodegradation of the photocured optical adhesive is no more than about 10% after 100 hours of aging of the optical ferrule assembly, the maximum minus the minimum value of w1' over the aging may be no more than about 10% higher than the minimum value of w1'. As still another example, in some embodiments where any change in insertion loss due to a photodegradation of the photocured optical adhesive is no more than about 0.3 or 0.08 dB after an aging of a mated optical ferrule assembly, the maximum minus the minimum insertion loss over the aging may be no more than about 0.3 or 0.08 dB.

In any case (e.g., for determining changes in I2, w1, w2, and/or insertion loss), the aging can be carried out for at least 100, 110, 120, 130, 140, 150, 200, 300, 350, 380, 400, 500, 600, 700, 800, 900, 1000, 1100, 1200, 1300, 1400, 1500, 1600, 2000, 4000, 5800, or 6000 hours at a temperature T. The aging can be carried out for up to 20000, 10000, 8000, 6000, 400, 2000, 1600, 100, 300, 200, 180, or 160 hours, for example. The aging time selected can depend on the intensity of the light used during the aging. For example, when a lower intensity is used, a longer aging time may be used. The temperature T can be at least 20, 25, 30, 35, 40, 45, 50, 55, 60, 65, 70, 75, 80, or 85 degrees C. The temperature T can be up to 120, 100, or 90 degrees C., for example. The temperature can be room temperature (about 23 degrees C.), about 35 degrees C., or about 60 degrees C., for example. The temperature used during aging may vary with time. For example, a temperature of at least 40 degrees C. may vary over a range of 40 to 80 degrees over the aging time. Any of the tests (e.g., for determining changes in I2, w1, w2 and/or insertion loss) can be carried out at a relative humidity that can be at least 40%, 45%, 50%, 55%, 60%, 65%, 70%, 75%, 80%, or 85%, for example. The relative humidity used during aging may vary with time. For example, a relative humidity of at least 40% may vary over a range of 40% to 90% over the aging time. Furthermore, the peak intensity I1 can be in any range described elsewhere herein. For example, the aging can be carried out for about 100 to 300 hours or about 100 to 150 hours at room temperature with a light having a wavelength of about 1270 nm propagating along the optical fiber having a peak intensity of about 6 GW/m². As another example, the aging can be carried out for about 350 to 400 hours at a temperature of about 35 degrees C. with a light having a wavelength of about 850 nm propagating along the optical fiber having a peak intensity of about 2 GW/m². As still another example, the aging can be carried out for about 600 to 1600 hours at a temperature of about 60 degrees C. with a light having a wavelength of about 1310 nm propagating along the optical fiber having a peak intensity of about 0.7 GW/m².

In FIG. 4, the mode or mode distribution of the light exiting the optical ferrule is schematically indicated as M and M' before and after ageing, respectively. The mode or mode distribution may be represented in terms of conventional modes used in beam optics such as Hermite-Gaussian or Laguerre-Gaussian modes. The exiting light may have mostly the same mode before and after aging. For example, the electric field of the exiting light can be expanded in a suitable basis before and after aging, and in some embodiments, the amplitude coefficients are dominated by a single amplitude coefficient before and after aging (e.g., the magnitude squared of the amplitude coefficient can be greater than 0.85, 0.9, 0.95, 0.96, 0.97, 0.98, or 0.99) both before and after aging where an amplitude coefficient having a magnitude of 1 means that the exiting light has the mode corresponding to the amplitude coefficient). In some embodiments, each of the modes M, M' is a substantially fundamental Gaussian mode TEM00 (the fundamental mode with transverse electric and magnetic fields). In some embodiments, for the at least the wavelength of about 1270 nm (or another wavelength or wavelength range described elsewhere herein) and before and after the at least 100 hours (or in a range described elsewhere herein) of aging of the optical ferrule assembly at the temperature of the at least 20 degrees C. (or in a range described elsewhere herein), the exiting light has mostly a same first Hermite-Gaussian mode. In some embodiments, the first Hermite-Gaussian mode is a TEM00 mode. In some embodiments, for the at least the wavelength of about 1270 nm (or another wavelength or wavelength range described elsewhere herein) and before and after the at least 100 hours (or in a range described elsewhere herein) of aging of the optical ferrule assembly at the temperature of the at least 20 degrees C. (or in a range described elsewhere herein), the exiting light has mostly a same first Laguerre-Gaussian mode. In some embodiments, the first Laguerre-Gaussian mode is a TEM00 mode. In sharp contrast, when conventional photocured optical adhesives are used, photodegradation of the photocured optical adhesive when aged can result in the mode changing from substantially a TEM00 mode, for example, to a higher order Laguerre-Gaussian mode or to a mixture of a TEM00 mode with a significant amount of one or more higher order Laguerre-Gaussian modes (e.g., the squared magnitude of the amplitude coefficient of the TEM00 mode after aging may be less than 0.8, 0.75, or 0.7 when it was greater than 0.85, 0.9, or 0.95 before aging).

Figure 5:
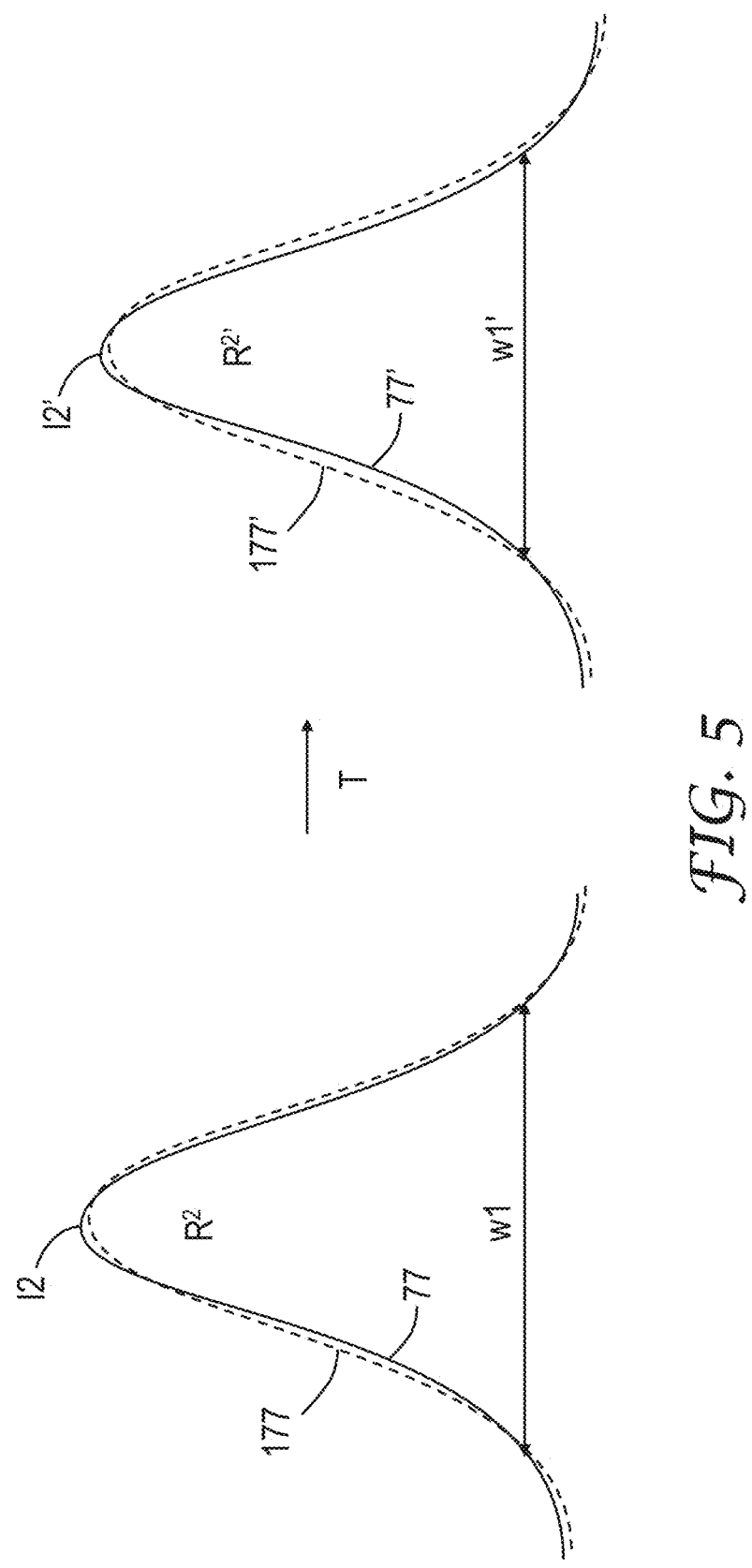
FIG. 5 schematically illustrates intensity distributions, and least squares fits to the intensity distributions, of light exiting an optical assembly before and after aging the optical assembly, according to some embodiments.

Alternatively, or in addition, when the exiting light has a substantially TEM00 mode, for example, the change in shape of the exiting light beam upon aging can be characterized by a change in a correlation coefficient R of a least squares fitting of a Gaussian function to an intensity profile of the exiting light. Here, the Gaussian function refers to the mathematical definition of the Gaussian function which is sometimes referred to as the fundamental Gaussian function (as opposed to higher-order Gaussian functions) in the Gaussian beam literature. The correlation coefficient R is the square root of the coefficient of determination of the least squares fit which is commonly denoted $R^2$. FIG. 5 schematically illustrates intensity distribution 77 and 77' and least squares fits 177 and 177' before and after aging, respectively, according to some embodiments. The coefficients of determination before and after aging are $R^2$ and $R^{2'}$, respectively. The beam size can be defined by the points of the intensity distribution at $e^{-2}$ times the peak intensity as schematically illustrated in FIG. 5, for example, for w1 and w1'.

In some embodiments, in a first plane (e.g., the xy-plane of FIG. 4) orthogonal to the exiting light at the first location (e.g., 120 of FIG. 1), a least squares fitting of a Gaussian function to an intensity profile of the exiting light has a first correlation coefficient R, and for the at least the wavelength of about 1270 nm (or another wavelength or in another range described elsewhere herein) and after the at least 100 hours (or another range described elsewhere herein) of aging of the optical ferrule assembly at the temperature of the at least 20 degrees C. (or another range described elsewhere herein), a least squares fitting of the Gaussian function to an intensity profile of the exiting light in the first plane has a second correlation coefficient R' different from the first correlation coefficient R by no more than about 5, 4, 3, 2, or 1%.

Figure 6:
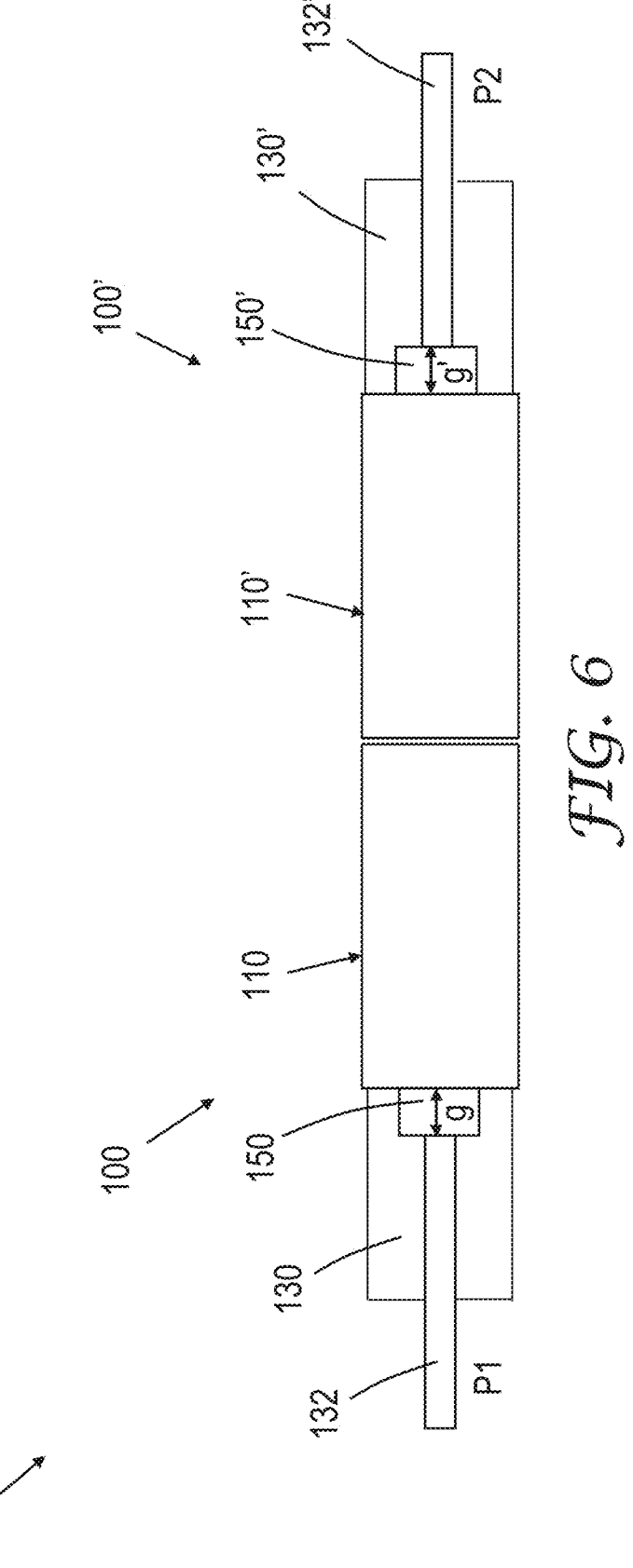
FIG. 6 is a schematic top view of a mated optical assembly, according to some embodiments.

FIG. 6 is a schematic top view of a mated optical assembly 1000 including optical ferrule assembly 100 mated with mating optical ferrule assembly 100', according to some embodiments. The mating optical ferrule assembly 100' can be substantially identical to the optical ferrule assembly 100. The optical ferrule assemblies 200, 300, or other optical ferrule assemblies can similarly be mated with a corresponding mating optical ferrule assembly. In some embodiments, an optical ferrule assembly (e.g., 100, 200, 300) is such that when the optical ferrule assembly mates with a mating optical ferrule assembly (e.g., 100') that includes a mating optical fiber (e.g., 132') attached to a mating attachment area (e.g., 130') and the photocured optical adhesive (e.g., 150' which has a same composition as 150) substantially filling a mating gap g' between a mating fiber end of the mating optical fiber and a mating light input surface and adhering to the mating light input surface and the mating fiber end to form a mated optical assembly 1000, light propagating along the optical fiber and having a peak intensity I1≥0.35 GW/m² (or in a range described elsewhere herein) and at least a wavelength in a range of about 850 nm to about 1350 nm, the mated optical assembly has a first insertion loss, and after at least 380 hours of aging of the mated optical assembly at a temperature of at least 20 degrees C. (or in a range described elsewhere herein), the mated optical assembly has a second insertion loss different from the first insertion loss by no more than about 0.3, 0.25, 0.2, 0.15, 0.12, 0.1, 0.08, 0.07, 0.06, 0.05, 0.04, 0.03, or 0.02 dB. The insertion loss in dB can be calculated as minus 10 times the base-10 logarithm of the ratio P2/P1 where P1 is the power of the light propagating in optical fiber 132 towards the optical ferrules 110 and 110' and P2 is the power of the light propagating in optical fiber 132' away from the optical ferrules 110 and 110'. The second insertion loss being different from the first insertion loss by no more than about 0.3 dB, for example, means that the absolute value of the difference between the first and second insertion losses is no more than about 0.3 dB.

The aging for determining change in insertion loss can be carried out at any of the temperatures T described elsewhere herein (e.g., for determining changes in I2, w1, and/or w2). The aging for determining change in insertion loss may be carried out for a longer time with a lower intensity light source than for determining changes in I2, w1, and/or w2, for example. In some embodiments, the aging for determining change in insertion loss is carried out for at least 380, 400, 500, 600, 700, 800, 900, 1000, 1100, 1200, 1300, 1400, 1500, 1600, 2000, 4000, 5800, or 6000 hours, for example, where the light propagating along the optical fiber can have a peak intensity I1≥0.35, 0.4, 0.45, 0.5, 0.55, 0.6, 0.65, 0.7, 0.75, 0.8, 0.9, 1, 1.25, 1.5, 1.75, 2, 2.25, or 2.5 GW/m², for example. In some embodiments, the aging for determining change in I2, w1 and/or w2 is carried out for at least 100, 100, 110, 120, 130, 140, or 150 hours, for example, where the light propagating along the optical fiber can have a peak intensity $I1 \geq 3$, 3.5, 4, 4.5, 5, 5.5, 6, 6.5, or 7 $GW/m^2$, for example.

In some embodiments, the mated optical assembly has a first insertion loss and after at least 100, 200, 300, 350, 380, 400, 500, 600, 700, 800, 900, 1000, 1100, 1200, 1300, 1400, 1500, 1600 hours of aging of the mated optical assembly at a temperature of at least 40, 45, 50, 55, 60, 65, 70, 75, 80, or 85 degrees C. with a light propagating along the optical fiber having a peak intensity of $I1 \geq 0.35$, 0.4, 0.45, 0.5, 0.55, 0.6, 0.65, 0.7, 0.75, or 0.8 $GW/m^2$, the mated optical assembly has a second insertion loss different from the first insertion loss by no more than about 0.3, 0.25, 0.2, 0.15, 0.1, 0.08, 0.07, 0.06, 0.05, 0.04, 0.03, or 0.02 dB, for example. In some embodiments, the mated optical assembly has a first insertion loss and after 200 hours of aging of the mated optical assembly at a temperature of 60 degrees C. with a light propagating along the optical fiber having a peak intensity of about 0.7 $GW/m^2$, the mated optical assembly has a second insertion loss different from the first insertion loss by no more than about 0.3, 0.25, 0.2, 0.15, 0.1, 0.08, 0.07, 0.06, 0.05, 0.04, 0.03, or 0.02 dB, for example. In some embodiments, the mated optical assembly has a first insertion loss and after 600 hours of aging of the mated optical assembly at a temperature of 60 degrees C. with a light propagating along the optical fiber having a peak intensity of about 0.7 $GW/m^2$, the mated optical assembly has a second insertion loss different from the first insertion loss by no more than about 0.3, 0.25, 0.2, 0.15, 0.1, 0.08, 0.07, 0.06, or 0.05 dB, for example. The light propagating along the optical fiber can have at least a wavelength in a range of about 850 nm to about 1350 nm. The wavelength in a range of about 850 nm to about 1350 nm can be or include a wavelength of about 1310 nm, for example.

In some embodiments, the mated optical assembly has a first insertion loss and after at least 100, 200, 300, 350, 380, 400, 500, 600, 700, 800, 900, 1000, 1100, 1200, 1300, 1400, 1500, 1600 hours of aging of the mated optical assembly at a temperature of at least 20, 25, 30, 35, 40, 45, 50, 55, 60, 65, 70, 75, 80, or 85 degrees C. with a light propagating along the optical fiber having a peak intensity $I1 \geq 1$, or 1.25, or 1.5, or 1.75, or 2, or 2.25, or 2.5 $GW/m^2$, the mated optical assembly has a second insertion loss different from the first insertion loss by no more than about 0.08, 0.07, 0.06, 0.05, 0.04, 0.03, or 0.02 dB, for example. In some embodiments, the mated optical assembly has a first insertion loss and after 380 hours of aging of the mated optical assembly at a temperature of 35 degrees C. with a light propagating along the optical fiber having a peak intensity of about 2 $GW/m^2$, the mated optical assembly has a second insertion loss different from the first insertion loss by no more than about 0.08, 0.07, 0.06, 0.05, 0.04, 0.03, or 0.02 dB, for example.

The photocured optical adhesive 150 can be substantially fully cured. Substantially fully cured can mean at least at least 98%, 98.5, 99, or 99.5% cured as defined, for example, by the degree of cure which can be determined using differential scanning calorimetry as the percent of total reacting enthalpy that can be released upon full curing. An alternative method for characterizing when the adhesive is substantially fully cured is using infrared spectroscopy and observing the substantial disappearance of the peak corresponding to (meth)acrylate functionality.

In some embodiments, the photocured optical adhesive comprises urethane di(meth)acrylate and (meth)acrylate monomers (e.g., a small percent of monomers may remain unreacted monomers after curing). In some embodiments, the photocured optical adhesive comprises a polymer derived from (meth)acrylate monomers and/or urethane di(meth)acrylate monomers. In some embodiments, the photocured optical adhesive comprises a urethane (meth)acrylate polymer. In some embodiments, at least 98, 98.5, 99, or 99.5 percent of all non-aromatic carbon-carbon bonds of the urethane (meth)acrylate polymer are single bonds.

Optical adhesives have been derived from raw materials derived from reacting hydroxy-terminated hydrogenated isoprene, or hydroxy-terminated hydrogenated polybutadiene, or hydroxy-terminated hydrogenated olefins with hydroxyethylmethacrylate (HEMA) (or hydroxyethylmethacrylate (HEA)) and hydroxyethylmethacrylate (IPDI). However, it has been found that such optical adhesives exhibit insufficient photostability for optical ferrule applications using O-band light, for example. Without intended to be limited by theory, it is believed that the photostability of such adhesives is limited by incomplete hydrogenation of the isoprene or polybutadiene such that the adhesive has non-aromatic carbon-carbon double bonds resulting in poor photostability. However, in some embodiments of the present description, the optical adhesive is substantially free of non-aromatic carbon-carbon double bonds (e.g., in some embodiments, at least 98, 98.5, 99, or 99.5 percent of all non-aromatic carbon-carbon bonds are single bonds). Such adhesives may use a crosslinker derived from polycaprolactone polyester polyol, polycarbonate polyol, polyether polyol, or a combination thereof, and from IPDI and one or more of HEA or HEMA.

The term (meth)acrylate is used to generally refer to acrylates and methacrylates. (Meth)acrylate may refer to (meth)acrylate monomers or oligomers or to polymers formed from polymerizing (meth)acrylate monomers or oligomers.

Examples of suitable (meth)acrylates that can be used in the composition (also referred to as a formulation) that is cured to provide the photocured optical adhesive include mono-, di-, and poly-(meth)acrylates and such as, for example, 1,2,4-butanetriol tri(meth)acrylate, 1,3-butylene glycol di(meth)acrylate, 1,3-propanediol di(meth)acrylate, 1,4-butanediol di(meth)acrylate, 1,4-cyclohexanediol di(meth)acrylate, 1,6-hexanediol di(meth)acrylate, 1,6-hexanediol monomethacrylate monoacrylate, 2-phenoxyethyl (meth)acrylate, alkoxylated cyclohexanedimethanol di(meth)acrylates, alkoxylated neopentyl glycol di(meth) acrylate, caprolactone-modified dipentaerythritol hexa(meth)acrylate, caprolactone modified neopentyl glycol hydroxypivalate di(meth)acrylate, cyclohexanedimethanol di(meth)acrylate, diethylene glycol di(meth)acrylate, dipentaerythritol penta(meth)acrylate, ditrimethylolpropane tetra (meth)acrylate, ethoxylated (10) bisphenol A di(meth)acrylate, ethoxylated (20) trimethylolpropane tri(meth)acrylate, ethoxylated (3) bisphenol A di(meth)acrylate, ethoxylated (3) trimethylolpropane tri(meth)acrylate, ethoxylated (30) bisphenol A di(meth)acrylate, ethoxylated (4) bisphenol A di(meth)acrylate, ethoxylated (4) pentaerythritol tetra(meth) acrylate, ethoxylated (6) trimethylolpropane tri(meth)acrylate, ethoxylated (9) trimethylolpropane tri(meth)acrylate, ethoxylated bisphenol A di(meth)acrylate, ethyl (meth)acrylate, ethylene glycol di(meth)acrylate, 2-ethylhexyl (meth) acrylate, glycerol tri(meth)acrylate, octyl (meth)acrylate, nonyl (meth)acrylate, decyl (meth)acrylate, lauryl (meth) acrylate, tridecyl (meth)acrylate, isobornyl (meth)acrylate, isopropyl (meth)acrylate, cyclohexyl (meth)acrylate, benzyl (meth)acrylate, phenyl (meth)acrylate, methyl (meth)acrylate, neopentyl glycol di(meth)acrylate, n-hexyl (meth)acrylate, pentaerythritol tetra(meth)acrylate, pentaerythritol tri (meth)acrylate, polyethylene glycol (200) di(meth)acrylate, polyethylene glycol (400) di(meth)acrylate, polyethylene glycol (600) di(meth)acrylate, propoxylated (3) glyceryl tri(meth)acrylate, propoxylated (3) trimethylolpropane tri (meth)acrylate, propoxylated (5.5) glyceryl tri(meth)acrylate, propoxylated (6) trimethylolpropane tri(meth)acrylate), propoxylated neopentyl glycol di(meth)acrylate, stearyl (meth)acrylate, tetraethylene glycol di(meth)acrylate, tricyclodecanedimethanol di(meth)acrylate, triethylene glycol di(meth)acrylate, trimethylolpropane tri(meth)acrylate, tripropylene glycol di(meth)acrylate, tris(2-hydroxyethyl) isocyanurate tri(meth)acrylate, urethane (meth)acrylates, polyester (meth)acrylates, and combinations thereof. Suitable (meth)acrylates may also include epoxy (meth)acrylates, however, in some embodiments, the adhesive formulation is substantially free of epoxy functionality (e.g., the formulation may include less than 2, 1, or 0.5 mole percent of any monomer that has epoxy functionality).

Suitable (meth)acrylates may contain hydroxyl groups and free-radically polymerizable functional groups in a single molecule. Examples of such materials include hydroxyalkyl (meth)acrylates such as 2-hydroxyethyl (meth)acrylate; 4-hydroxybutyl (meth)acrylate; poly(propylene glycol) (meth)acrylate; 2-hydroxypropyl (meth)acrylate; glycerol mono- or di-(meth)acrylate; trimethylolpropane mono- or di-(meth)acrylate; pentaerythritol mono-, di-, and tri-(meth)acrylate; sorbitol mono-, di-, tri-, tetra-, or penta(meth)acrylate; and 2,2-bis[4-(2-hydroxy-3-methacryloxypropoxy)phenyl]propane (bisGMA).

Suitable urethane (meth)acrylate oligomer(s) may include aromatic urethane acrylates, aliphatic urethane acrylates, aromatic/aliphatic urethane acrylates and combinations thereof. Many urethane (meth)acrylate oligomer(s) are available commercially. Suitable examples of urethane (meth)acrylate oligomer(s) may be obtained from Arkema, King of Prussia, Pennsylvania, CN9001 (urethane acrylate oligomer), CN0931 (urethane acrylate oligomer), CN9030 (urethane acrylate oligomer); Allnex, Frankfurt, Germany, and marketed as EBECRYL 8804 (aliphatic urethane diacrylate), EBECRYL 8808 (undiluted aliphatic urethane diacrylate); SOLTECH LTD., Yangsan, South Korea, and marketed as SUA5387 (aliphatic urethane acrylate), SUA5371 (difunctional aliphatic urethane acrylate oligomer); Dymax, Torrington, Connecticut, and marketed as BR-3747AE (aliphatic polyether urethane acrylate), BRC-843S (hydrophobic urethane acrylate), BRC-842 MB (hydrophobic urethane methacrylate), and combinations thereof. Other suitable urethane (meth)acrylate oligomer(s) may be prepared by the reaction of (i) a polyisocyanate and a hydroxy-functional (meth)acrylate, and/or (ii) a polyisocyanate, a polyol, and a hydroxy-functional (meth)acrylate. In some examples, the urethane (meth)acrylate is a reaction product of one or more polyisocyanate(s), one or more polyol(s), and one or more hydroxy-functional (meth)acrylate(s).

Suitable free-radically polymerizable compounds are available from a wide variety of commercial sources such as, for example, Sartomer Co., Exton, Pennsylvania and/or can be made by known methods.

Compositions according to the present description can be polymerized/cured by exposure to actinic radiation (e.g., electromagnetic actinic radiation). Optionally, heat can be used in combination with actinic radiation to cure the composition. Actinic radiation is electromagnetic radiation that is absorbed by one or more components of the photopolymerizable composition that ultimately leads to at least partial free-radical polymerization of the composition.

Exemplary actinic radiation has a wavelength of from 250 nanometers to 700 nanometers. The source(s) of actinic radiation is/are selected such that the actinic radiation is of an appropriate wavelength to be absorbed by the photoinitiator(s). Exemplary sources of actinic radiation may include lasers (ultraviolet or visible), broad spectrum flashlamps (e.g., xenon flashlamps), and low-, medium-, and high-pressure mercury arc lamp mercury arc lamps, microwave-driven mercury lamps (e.g., using H-type, V-type, or D-type bulbs), and light emitting diode (LEDs). Further details associated with radiation curing are well-known to those skilled in the art.

The curable composition used to make the photocured optical adhesive comprises at least one photoinitiator, meaning that the initiator is activated by light, generally ultraviolet (UV) light, although other light sources could be used with the appropriate choice of initiator, such as a visible-light initiator or an infrared-light initiator. Typically, UV photoinitiators are used. Useful photoinitiators include those known as useful for photocuring free-radically (meth)acrylates. Exemplary photoinitiators include benzoin and its derivatives such as alpha-methylbenzoin; alpha-phenylbenzoin; alpha-allylbenzoin; alpha benzylbenzoin; benzoin ethers such as benzil dimethyl ketal (e.g., "OMNIRAD BDK" from IGM Resins USA Inc., St. Charles, IL), benzoin methyl ether, benzoin ethyl ether, benzoin n-butyl ether; acetophenone and its derivatives such as 2-hydroxy-2-methyl-1-phenyl-1-propanone (e.g., available under the trade designation OMNIRAD 1173 from IGM Resins USA Inc., St. Charles, IL) and 1-hydroxycyclohexyl phenyl ketone (e.g., available under the trade designation OMNIRAD 184 from IGM Resins USA Inc., St. Charles, IL); 2-methyl-1-[4-(methylthio)phenyl]-2-(4-morpholinyl)-1-propanone (e.g., available under the trade designation OMNIRAD 907 from IGM Resins USA Inc., St. Charles, IL); 2-benzyl-2-(dimethylamino)-1-[4-(4-morpholinyl)phenyl]-1-butanone (e.g., available under the trade designation OMNIRAD 369 from IGM Resins USA Inc., St. Charles, IL) and phosphine oxide derivatives such as ethyl-2,4,6-trimethylbenzoylphenyl phoshinate (e.g. available under the trade designation TPO-U from IGM Resins USA Inc., St. Charles, IL), and bis-(2,4,6-trimethylbenzoyl)-phenylphosphine oxide (e.g., available under the trade designation OMNIRAD 819 from IGM Resins USA Inc., St. Charles, IL) and combinations thereof.

Typically, the photoinitiator is used in amounts of 0.01 to 10 parts by weight, more typically 0.5 to 8.0 parts by weight, most typically 1.5 to 7.0 parts by weight relative to 100 parts by weight of total reactive components.

In some embodiments, the photocured optical adhesive comprises a urethane (meth)acrylate polymer comprising or more of carbonate moieties, caprolactone moieties, or ether moieties. In some embodiments, the photocured optical adhesive comprises a urethane (meth)acrylate polymer comprising one or more of polycarbonate groups, polycaprolactone groups, or polyether groups. In some embodiments, the urethane (meth)acrylate polymer further comprises one or more 6-membered hydrocarbon rings. The one or more 6-membered hydrocarbon rings can comprise one or more 6-membered aliphatic hydrocarbon rings, one or more 6-membered aromatic hydrocarbon rings, or a combination thereof.

In some embodiments, the photocured optical adhesive is preparable as a reaction product of a resin or formulation (e.g., photocurable optical adhesive formulation) comprising one or more (meth)acrylate monomers or oligomers; one or more photoinitiators; and one or more aliphatic urethane (meth)acrylate crosslinkers. In some embodiments, the resin comprises the one or more photoinitiators at 1.5 to 7, or 2 to 6, or 2.5 to 5.5, or 2.8 to 5 weight percent based on a total weight of the resin or formulation. In some such embodiments, or in other embodiments, the resin comprises the one or more aliphatic urethane (meth)acrylate crosslinkers at 20 to 70, 25 to 65, or 30 to 60 weight percent based on a total weight of the resin or formulation. In some such embodiments, or in other embodiments, at least one crosslinker of the one or more aliphatic urethane (meth)acrylate cross-linkers comprises one or more of a polycarbonate urethane (meth)acrylate, a polyether urethane (meth)acrylate, or a polycaprolactone urethane (meth)acrylate. The one or more (meth)acrylate monomers or oligomers can comprise at least one polar (meth)acrylate monomer or oligomer and at least one non-polar polar (meth)acrylate monomer or oligomer. The at least one polar (meth)acrylate monomer or oligomer can comprise 2-hydroxyethyl (meth)acrylate, and/or the at least one non-polar (meth)acrylate monomer or oligomer can comprise one or more of isobornyl (meth)acrylate, benzyl (meth)acrylate, or lauryl (meth)acrylate. The one or more photoinitiators can comprise 1-hydroxycyclohexyl phenyl ketone, for example.

The photocurable formulation or resin used to make the photocured optical adhesive may also comprise at least one stabilizer or antioxidant. Suitable stabilizers or antioxidants may include 4-methoxyphenol (MEHQ), butylated hydroxytoluene (BHT), pentaerythritol tetrakis(3-(3,5-di-tert-butyl-4-hydroxyphenyl)propionate) (e.g., IRGANOX 1010 available from BASF) or a combination thereof.

In some embodiments, the one or more (meth)acrylate monomers or oligomers comprises one or more of isobornyl (meth)acrylate, benzyl (meth)acrylate, 2-hydroxyethyl (meth)acrylate, or lauryl (meth)acrylate. In some embodiments, the one or more (meth)acrylate monomers or oligomers comprises isobornyl (meth)acrylate, benzyl (meth)acrylate, 2-hydroxyethyl (meth)acrylate, and lauryl (meth)acrylate. In some embodiments, the one or more (meth)acrylate monomers or oligomers comprises isobornyl (meth)acrylate at 5 to 35, 10 to 30, or 15 to 28 weight percent based on the total weight of the resin or formulation. In some such embodiments, or in other embodiments, the one or more (meth)acrylate monomers or oligomers comprises benzyl (meth)acrylate at 1, to 30, 3 to 25, or 5 to 20 weight percent based on the total weight of the resin or formulation. In some such embodiments, or in other embodiments, the one or more (meth)acrylate monomers or oligomers comprises 2-hydroxyethyl (meth)acrylate at 1 to 30, 3 to 25, or 5 to 23 weight percent based on the total weight of the resin or formulation. In some such embodiments, or in other embodiments, the one or more (meth)acrylate monomers or oligomers comprises lauryl (meth)acrylate at 1 to 20, 2 to 15, or 3 to 12 weight percent based on the total weight of the resin or formulation.

In some embodiments, an optical adhesive formulation is provided. The optical adhesive formulation can be any of the resins described herein. In some embodiments, a photocurable optical adhesive formulation comprising: one or more (meth)acrylate monomers or oligomers; one or more photoinitiators at 1.5 to 7 weight percent (or in another range described elsewhere herein) based on a total weight of the adhesive formulation; and one or more aliphatic urethane (meth)acrylate crosslinkers at 25 to 65 weight percent (or in another range described elsewhere herein) based on the total weight of the adhesive formulation. In some embodiments, when the adhesive formulation is substantially fully cured to form a photocured optical adhesive layer (e.g., corresponding to photocured optical adhesive 150 schematically illustrated in FIG. 1) comprising a urethane (meth)acrylate polymer and having an average thickness of about 80 micrometers between opposing first and second major surfaces of the photocured optical adhesive layer (e.g., opposing major surfaces 151 and 152 of photocured optical adhesive 150 schematically illustrated in FIG. 1), at least 98% (or in a range described elsewhere herein) of all non-aromatic carbon-carbon bonds of the urethane (meth) acrylate polymer are single bonds. In some embodiments, when a light propagating along an optical fiber and having a peak intensity I1 of about 6 $GW/m^2$ exits a fiber end of the optical fiber in contact with the first major surface of the photocured optical adhesive layer such that the light is transmitted through the first and second major surfaces of the photocured optical adhesive layer, the transmitted light has a first beam size along a first lateral direction at a first location (e.g., location 120 schematically illustrate in FIG. 1). In some embodiments, at least for a wavelength of about 1270 nm and after at least 100 hours of the light being transmitted through the photocured optical adhesive layer, any change in the first beam size of the transmitted light at the first location due to a photodegradation of the photocured optical adhesive layer is no more than about 10% (or in a range described elsewhere herein). In some embodiments, when the adhesive formulation is substantially fully cured to form the photocured optical adhesive layer, the photocured optical adhesive layer adheres the fiber end to a light input surface of an optical ferrule, and wherein the light transmitted through the photocured optical adhesive layer exits the optical ferrule through a light output surface of the optical ferrule and then propagates to the first location. In some embodiments, for the at least the wavelength of about 1270 nm, a linear least squares fit of a plot of the first beam size of the transmitted light at the first location versus time for the at least 100 hours of the light being transmitted through the photocured optical adhesive layer has a coefficient of determination $R^2$ of at least 0.85, 0.88, 0.9, 0.91, or 0.92. The magnitude of the slope of the linear least squares fit can be less than less than about $10^{-4}$ $min^{-1}$ or can be in any of the ranges described elsewhere herein.

Examples

Unless otherwise noted, all parts, percentages, ratios, etc. in the examples and the rest of the specification are by weight. Materials used in the examples are available from commercial suppliers and/or can be made by known methods, unless indicated otherwise.

| Material/Description | Abbreviation | Vendor |
|---|---|---|
| Aliphatic Urethane Acrylate Oligomer obtained as BOMAR BRC-843S | BRC-843S | Dymax, Torrington, CT 06790, USA |
| Aliphatic Urethane Methacrylate Oligomer obtained as Bomar BR842M | BR842M | Dymax, Torrington, CT 06790, USA |
| Isobornyl methacrylate (obtained as SR423A) | IBOMA | Arkema, King of Prussia, PA 19406, USA |
| Benzyl methacrylate (obtained as MIRMER M1183HP) | BzMA | Miwon Specialty Chemical, South Korea |
| 2-Hydroxyethyl methacrylate | HEMA | Millipore Sigma, St. Louis, Missouri 63103, USA |
| Lauryl acrylate (obtained as SR335) | LA | Arkema, King of Prussia, PA 19406, USA |
| Lauryl methacrylate (obtained | LMA | Arkema, King of Prussia, |

-continued

| Material/Description | Abbreviation | Vendor |
|---|---|---|
| as SR313A) | | PA 19406, USA |
| 1-hydroxycyclohexyl phenyl ketone photoinitiator (obtained as OMNIRAD 184) | OR 184 | IGM Resins, St. Charles, IL 60174, USA |
| Aliphatic Urethane Acrylate Oligomer obtained as SUA5387 | SUA5387 | Soltech Ltd., Korea |
| Acrylate adhesive (obtained as AT6001) | AT6001 | NTT Advanced Technology Corporation |
| Epoxy/acrylate adhesive (obtained as Norland Optical Adhesive 52) | NOA 52 | Norland Products, East Windsor, NJ |
| Epoxy/acrylate adhesive (obtained as Norland Optical Adhesive 53) | NOA 53 | Norland Products, East Windsor, NJ |
| Thiol/acrylate adhesive (obtained as Norland Optical Adhesive 87) | NOA 87 | Norland Products, East Windsor, NJ |
| Acrylate adhesive (obtained as Norland Optical Adhesive 1482) containing aliphatic difunctional acrylate and glycol diacrylate | NOA 1482 | Norland Products, East Windsor, NJ |
| Epoxy-based UV curable adhesive (obtained as AB9028) | AB9028 | ANGSTROMBOND |
| Acrylate-based UV curable adhesive (obtained as AB9047) | AB9047 | ANGSTROMBOND |
| Hydrogenated, hydroxy-terminated polyolefin (obtained as KRASOL HLBH P 3000) | KP3 | Total Petrochemicals & Refining USA, Inc., Cray Valley Division, Houston TX |
| Both-end hydroxyl group-terminated hydrogenated polybutadiene (obtained as GI-1000) | G1 | Nippon Soda Co., LTD. Tokyo Japan. |

Preparation of Adhesive Formulations A1-A7

Formulations were prepared by combining the components indicated in the following table into a polypropylene mixing cup (from FlackTek, Inc., Landrum, SC). The cup was closed with a polypropylene lid and the mixture was high shear mixed at ambient temperature and pressure using a SPEEDMIXER (Hauschild SpeedMixer inc., Dallas Texas) for at least 30 s at 2000 revolutions per minute (rpm) or until the formulation became homogeneous.

| Form. | Cross-linker | Cross-linker (wt %) | IBOMA (wt %) | BzMA (wt %) | HEMA (wt %) | LA (wt %) | LMA (wt %) | OR 184 |
|---|---|---|---|---|---|---|---|---|
| A1 | BRC-843S | 41.4 | 18.1 | 9.0 | 18.0 | 9.1 | | 4.5 |
| A2 | BRC-843S | 46.3 | 20.5 | 10.5 | 10.8 | | 8.8 | 3.1 |
| A3 | BRC-843S | 42.7 | 21.9 | 11.2 | 11.5 | | 9.4 | 3.3 |
| A4 | BRC-843S | 42.7 | 21.9 | 16.4 | 11.5 | | 4.4 | 3.1 |
| A5 | SUA5387 | 44.7 | 21.1 | 11.4 | 11.3 | | 8.3 | 3.1 |
| A6 | BR842M | 51.9 | 20.1 | 11 | 10 | | 4.1 | 3 |
| A7 | BR842M | 45.8 | 17.9 | 14.5 | 14.6 | | 4.3 | 2.9 |

Preparation of Comparative Adhesive Formulations C1 to C4

Urethane diamethcrylate (UDMA) adhesive formulations C1 to C4 were made for comparison as follows. To a polypropylene mixing cup (from FlackTek, Inc., Landrum, SC) was added DBTDL (500 ppm), and the amount of hydroxy-terminated olefin (KP3 or G1) and IPDI indicated in the table below (approximate mole ratios are indicated in parentheses), nitrogen was blown over the solution for at least 20 s before closing the propylene cup with an appropriate propylene lid. Subsequently, the solution was high shear mixed at ambient temperature and pressure using a SPEEDMIXER (Hauschild SpeedMixer inc., Dallas Texas) for at least 60 s at 2000 revolutions per minute (rpm) and placed in an oven at 70° C. for 3 hours. The cup was mixed for at least 60 s at 2000 rpm at least once during the 3 hours. Then, the amounts of 2-hydroxyethyl methacrylate, isobornyl methacrylate, benzyl methacrylate, lauryl acrylate, and OMNIRAD 184 (OR 184) indicated in the table below were added and mixed for at least 60 s at 2000 rpm. The final compositions were homogeneous, clear, and colorless.

| Form. | Oligomer | Oligomer (wt %) | IBOMA (wt %) | BzMA (wt %) | HEMA (wt %) | LA (wt %) | OR 184 |
|---|---|---|---|---|---|---|---|
| C1 | KP3(1) + IPDI(2) + HEMA(2) | 40.5 | 18.1 | 9.4 | 19.6 | 7.7 | 4.7 |
| C2 | G1(1) + IPDI(2) + HEMA (2) | 45.9 | 20.5 | 10.5 | 11.1 | 8.9 | 3.1 |
| C3 | G1(2) + IPDI(2) + HEMA (2) | 46 | 20.5 | 10.6 | 11.1 | 8.7 | 3.1 |
| C4 | G1(2) + IPDI(2) + HEMA (2) | 40.6 | 17.9 | 9.8 | 19.7 | 7.6 | 4.6 |

Optical Testing

Optical fibers were mounted to optical ferrules similar to those shown in FIGS. 3A-3C of U.S. Pat. No. 11,307,362 (Haase et al.) and an adhesive indicated in the tables below was used to attach ends the optical fibers to light input surfaces of the optical ferrules. The thickness of the adhesive between the fiber ends and the light input surface was about 80 micrometers.

Pairs of optical ferrules utilizing a same adhesive according to the table below were mated to each other and the change in insertion loss before and after aging was determined and is reported in the table for an aging time (duration) indicated in the table. The temperature T (35 degrees C. or room temperature (RT)), wavelength (Lambda), mode field diameter (MFD), and peak intensity of light propagating in the fiber are reported in the table below. An additional comparative UDMA composition, C5, which can be made as generally described for C1-C4, was also tested.

| Adhesive | T (° C.) | Lambda (nm) | Power (mW) | MFD (μm) | Peak Intensity (GW/m²) | Duration (days) | Change in Insertion Loss (dB) |
|---|---|---|---|---|---|---|---|
| C5 | 35 | 850 | 20 | 5 | 2.04 | 16 | +0.09 |
| A4 | 35 | 850 | 20 | 5 | 2.04 | 16 | +0.02 |
| C5 | 35 | 1310 | 20 | 9.2 | 0.60 | 98 | +0.36 |

-continued

| Adhe-sive | T (° C.) | Lambda (nm) | Power (mW) | MFD (μm) | Peak Inten-sity (GW/m²) | Dura-tion (days) | Change in In-sertion Loss (dB) |
|---|---|---|---|---|---|---|---|
| A1 | RT | 1270 | 50 | 9.2 | 1.50 | 11 | +0.07 |
| A4 | RT | 1270 | 50 | 9.2 | 1.50 | 11 | +0.14 |
| A3 | RT | 1270 | 50 | 9.2 | 1.50 | 11 | +0.34 |
| A2 | RT | 1270 | 50 | 9.2 | 1.50 | 11 | +0.42 |
| A1 | RT | 1270 | 25 | 9.2 | 0.75 | 32 | +0.05 |
| A4 | RT | 1270 | 25 | 9.2 | 0.75 | 32 | +0.06 |
| A3 | RT | 1270 | 25 | 9.2 | 0.75 | 32 | +0.55 |
| A2 | RT | 1270 | 25 | 9.2 | 0.75 | 32 | +0.61 |

Figure 7:
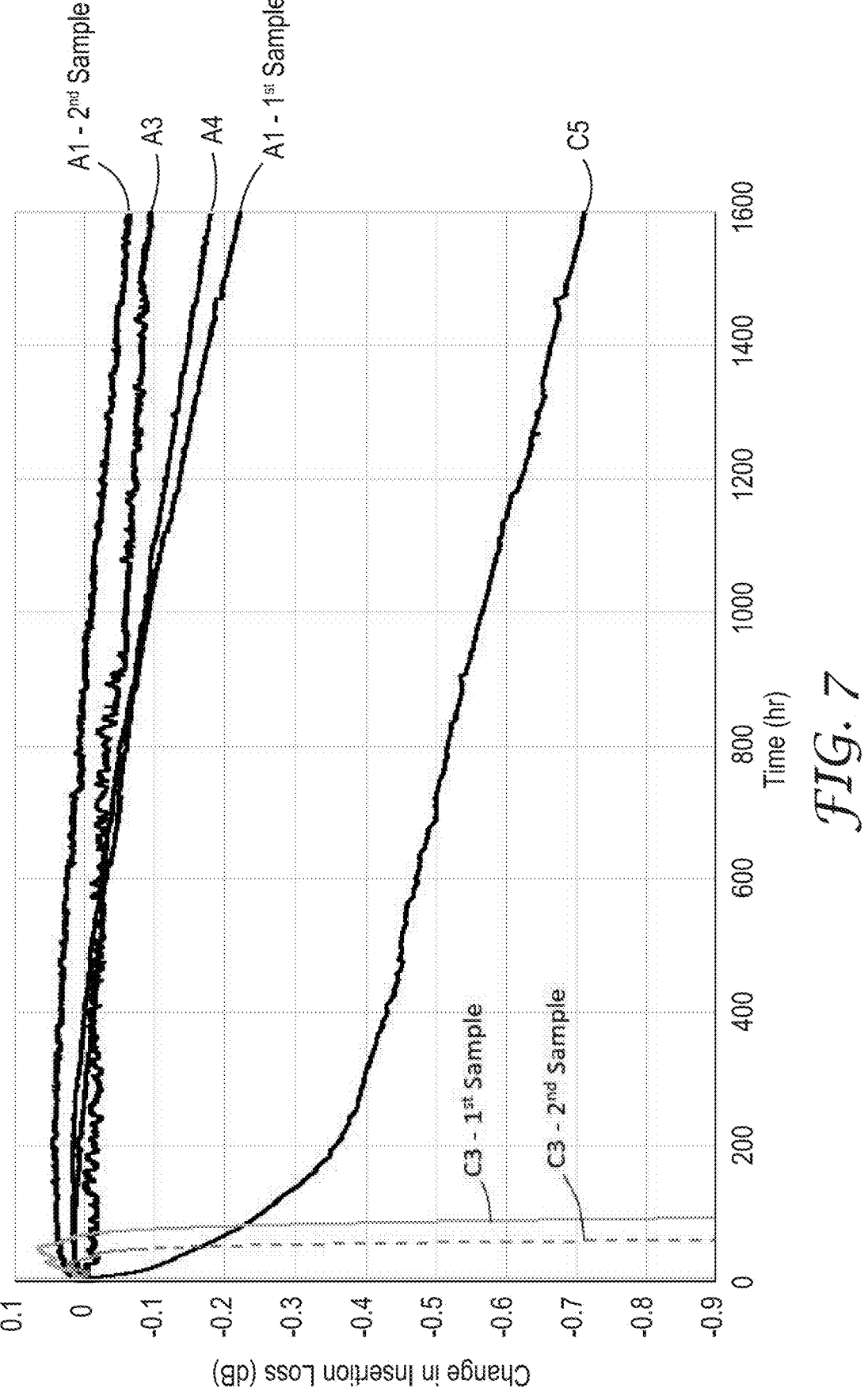
FIG. 7 is a plot of change in insertion loss versus time for various exemplary and comparative mated optical assemblies.

Additional samples of mated optical ferrule assemblies were prepared and tested at a temperature of 60 degrees C. with light propagating along the optical fiber having a peak intensity of about 0.7 GW/m² and a wavelength of 1310 nm. In some cases, multiple samples of a formulation were measured in an experiment and averaged. Results are shown in FIG. 7 where two different experiments for samples using adhesives prepared as described for adhesives A1 and C3 are shown.

Figure 8:
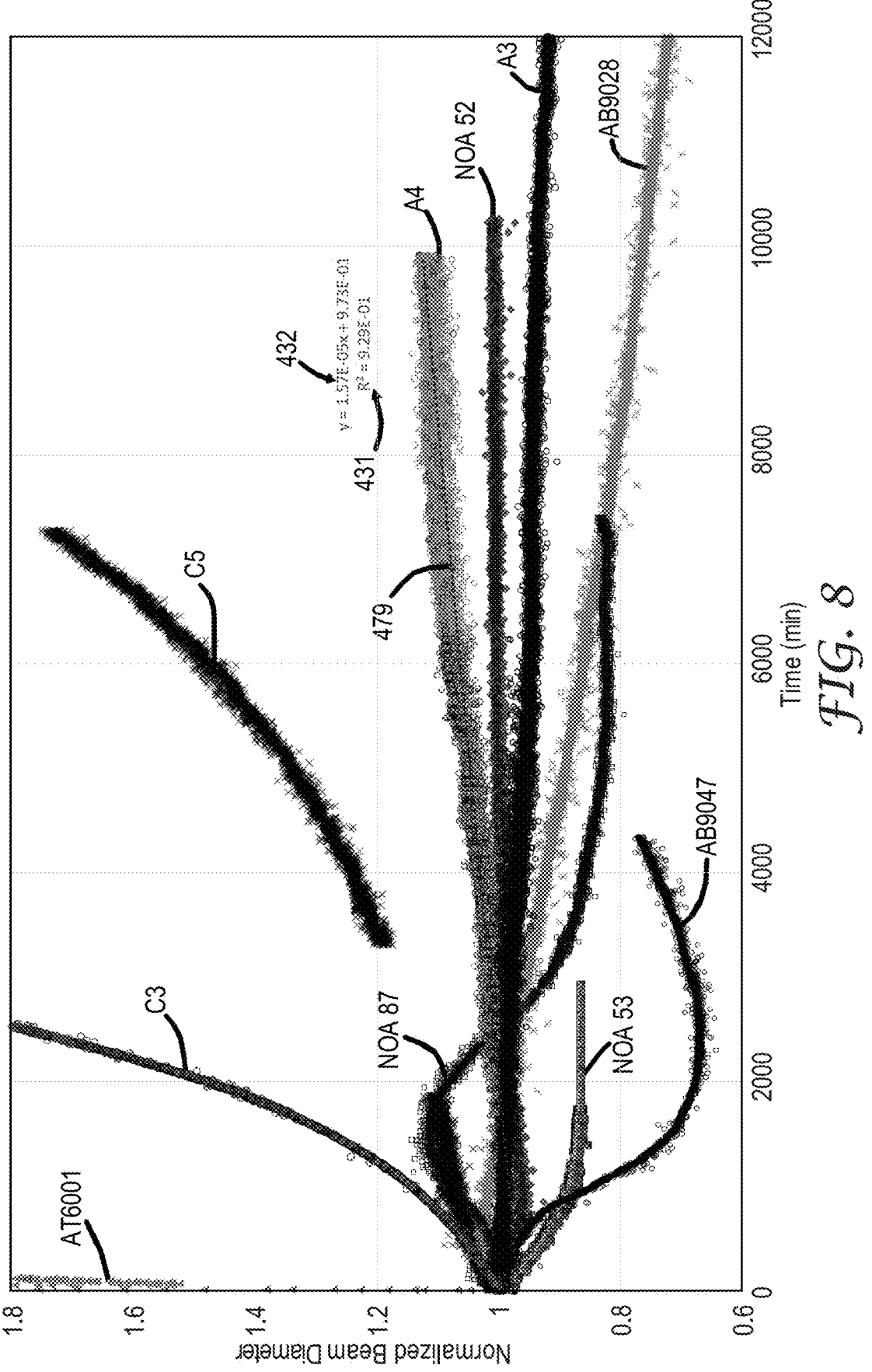
FIG. 8 is a plot of normalized beam diameter versus time for various exemplary and comparative optical assemblies.
Figure 9:
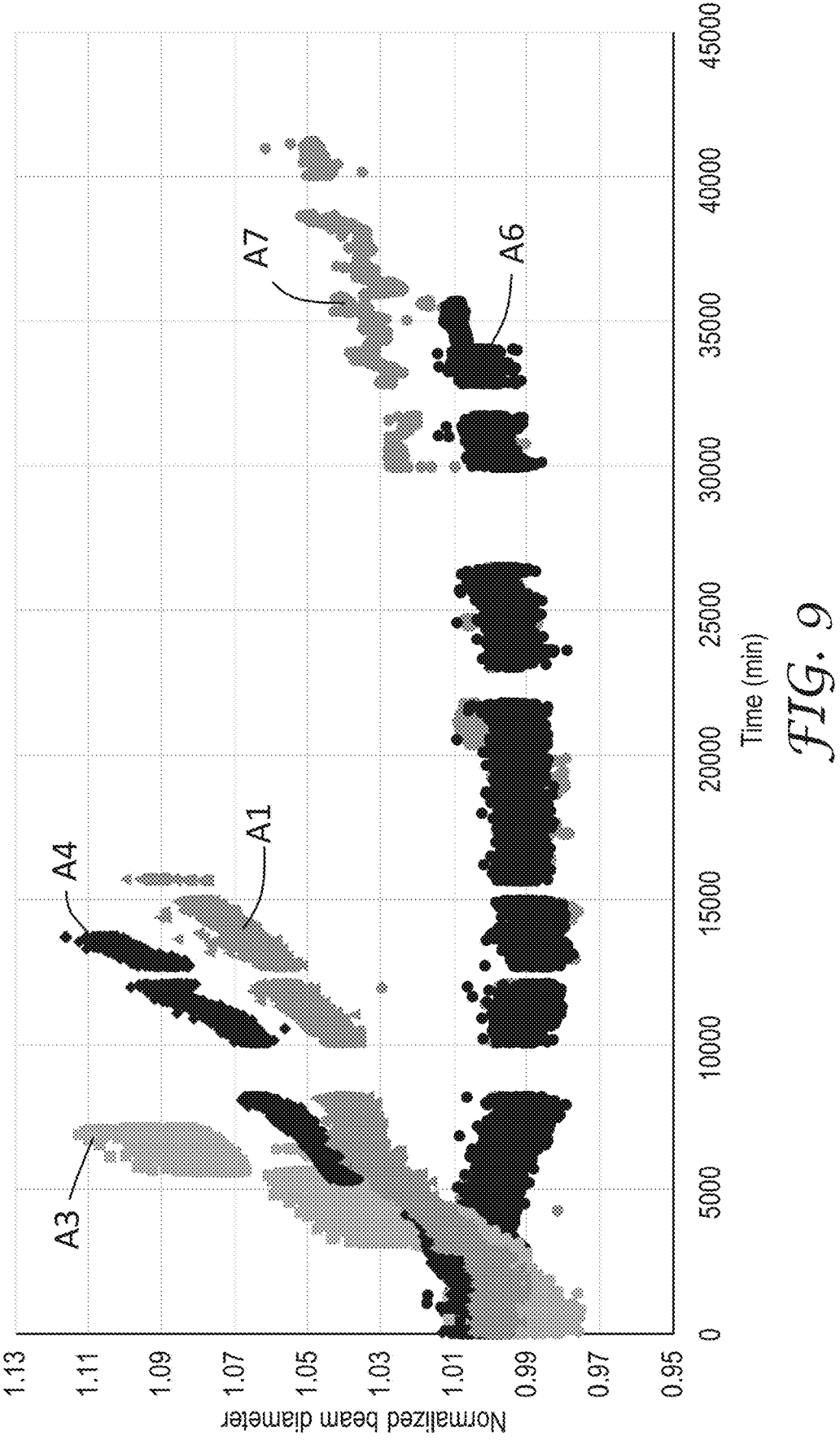
FIG. 9 is a plot of normalized beam diameter versus time for various exemplary optical assemblies.

For single optical ferrules, normalized beam diameter (beam diameter of exiting light divided by initial beam diameter of the exiting light) verses time for aging conditions of room temperature, wavelength of 1270 nm, and power of 200 mW or 50 mW, MED in fiber of 9.2 micrometers was determined for various adhesives and are shown in FIG. 8 (for power of 200 mW) and FIG. 9 (for power of 50 mW). The peak intensity in the fiber was about 6 GW/m² or 1.5 GW/m² for the power of 200 mW or 50 mW, respectively. A camera was used to measure the intensity distribution of the beam and the beam size was determined as the diameter where the intensity dropped to $e^{-2}$ of the peak intensity. In cases where the beam spot was not circular, major and minor diameters were determined and the beam size was taken to be a weighted average of these diameters given by 0.83 times the major diameter plus 0.17 times the minor diameter. The coefficient of determinations, $R^2$, for linear least squares fits of the plots of FIG. 8 are given in the table below. The $R^2$ for the NOA 52 sample was low due at least in part to substantial upward, then downward, then upward again, shifts in the beam size in the first 2000 minutes of aging. The linear least squares fits for A3, A4 and NOA 52 had slopes of $1.57 \times 10^{-5}$ min$^{-1}$, $-6.52 \times 10^{-6}$ min$^{-1}$, and $3.42 \times 10^{-6}$ min$^{-1}$, respectively. The table below shows results for the percent change in beam size before and after aging for the duration indicated in the table.

| Adhesive | Power (mW) | Duration (min) | Change in Beam Size | R² |
|---|---|---|---|---|
| A3 | 200 | 7300 | -6% | 0.92 |
| A4 | 200 | 7300 | 9% | 0.93 |
| AT6001 | 200 | 1250 | 155% | 0.83 |
| NOA 52 | 200 | 1000 | -4% | 0.57 |
| NOA 53 | 200 | 1600 | -13% | 0.70 |
| NOA 87 | 200 | 6000 | -18% | 0.50 |
| NOA 1482 | 200 | 3000 | 20% | |
| NOA 1482 | 200 | 6000 | 63% | |
| AB9028 | 200 | 15000 | -32% | |
| AB9047 | 200 | 2300 | -33% | |
| C1 | 200 | 1700 | 98% | |
| C2 | 200 | 1200 | 11% | |
| C3 | 200 | 2000 | 49% | 0.97 |
| C4 | 200 | 2000 | 53% | |

-continued

| Adhesive | Power (mW) | Duration (min) | Change in Beam Size | R² |
|---|---|---|---|---|
| C5 | 200 | 7300 | 72% | 0.93 |
| A4 | 50 | 11000 | 7% | |
| A6 | 50 | 30000 | -0.5% | |
| A7 | 50 | 30000 | 2.4% | |

The beam size shift for sample C4 was similar to that of C3. For sample C3, the beam shape changed from substantially Gaussian before aging to donut-like shape with a higher intensity periphery region surrounding a lower intensity interior region.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially" with reference to a property or characteristic is not otherwise clear to one of ordinary skill in the art in the context in which it is used and described in the present description and when it would be clear to one of ordinary skill in the art what is meant by an opposite of that property or characteristic, the term "substantially" will be understood to mean that the property or characteristic is exhibited to a greater extent than the opposite of that property or characteristic is exhibited.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. An optical ferrule assembly comprising:

an optical ferrule comprising an attachment area and a light coupling portion comprising a light input surface and a light output surface;

an optical fiber secured to the attachment area and comprising a fiber end, the light input surface and the fiber end defining a gap therebetween; and a photocured optical adhesive substantially filling the gap and adhering to the light input surface and the fiber end, such that light propagating along the optical fiber and having a peak intensity $I1 \geq 3$ GW/m$^2$, exits the fiber end and enters the light coupling portion of the optical ferrule through the light input surface after traversing the gap through the photocured optical adhesive, and exits the optical ferrule through the light output surface after traversing the light coupling portion, the exiting light having a first beam size along a first lateral direction at a first location from the light output surface, such that at least for a wavelength of about 1270 nm and after at least 100 hours of aging of the optical ferrule assembly at a temperature of at least 20 degrees C., any change in the first beam size of the exiting light at the first location due to a photodegradation of the photocured optical adhesive is no more than about 10%.

2. The optical ferrule assembly of claim 1, wherein the peak intensity $I1$ is about 6 GW/m$^2$ and after 100 hours of aging of the optical ferrule assembly at a temperature of 23 degrees C., the any change in the first beam size of the exiting light at the first location due to a photodegradation of the photocured optical adhesive is no more than about 9%.

3. The optical ferrule assembly of claim 1, wherein the exiting light has a second beam size along a second, orthogonal to the first, lateral direction at the first location from the light output surface, such that for the at least the wavelength of about 1270 nm and after the at least 100 hours of aging of the optical ferrule assembly at the temperature of the at least 20 degrees C., any change in the second beam size of the exiting light at the first location due to a photodegradation of the photocured optical adhesive is no more than about 10%.

4. The optical ferrule assembly of claim 1, wherein for the at least the wavelength of about 1270 nm and before and after the at least 100 hours of aging of the optical ferrule assembly at the temperature of the at least 20 degrees C., the exiting light has mostly a same first Laguerre-Gaussian mode.

5. The optical ferrule assembly of claim 1, wherein a linear least squares fit of a plot of the first beam size of the exiting light at the first location versus time for the at least 100 hours of aging of the optical ferrule assembly has a coefficient of determination R$^2$ of at least 0.85.

6. The optical ferrule assembly of claim 1, wherein the photocured optical adhesive comprises a urethane (meth) acrylate polymer, at least 98% of all non-aromatic carbon-carbon bonds of the urethane (meth)acrylate polymer being single bonds.

7. The optical ferrule assembly of claim 6, wherein the photocured optical adhesive comprises a reaction product of an adhesive formulation comprising:

one or more (meth)acrylate monomers or oligomers;

one or more photoinitiators at 1.5 to 7 weight percent based on a total weight of the adhesive formulation; and one or more aliphatic urethane (meth)acrylate cross-linkers at 25 to 65 weight percent based on the total weight of the adhesive formulation.

8. The optical ferrule assembly of claim 6, wherein the urethane (meth)acrylate polymer comprises one or more of polycarbonate groups, polycaprolactone groups, or polyether groups.

9. An optical ferrule assembly comprising:

an optical ferrule comprising an attachment area and a light coupling portion comprising a light input surface and a light output surface;

an optical fiber secured to the attachment area and comprising a fiber end, the light input surface and the fiber end defining a gap therebetween; and a photocured optical adhesive substantially filling the gap and adhering to the light input surface and the fiber end, such that light propagating along the optical fiber and having a peak intensity $I1 \geq 3$ GW/m$^2$, exits the fiber end and enters the light coupling portion of the optical ferrule through the light input surface after traversing the gap through the photocured optical adhesive, and exits the optical ferrule through the light output surface after traversing the light coupling portion, the exiting light having a peak intensity $I2$, such that at least for a wavelength of about 1270 nm and after at least 100 hours of aging of the optical ferrule assembly at a temperature of at least 20 degrees C., any change in $I2$ due to a photodegradation of the photocured optical adhesive is no more than about 25%.

10. The optical ferrule assembly of claim 9, wherein the peak intensity $I1$ is about 6 GW/m$^2$ and after 100 hours of aging of the optical ferrule assembly at a temperature of 23 degrees C., the any change in $I2$ due to a photodegradation of the photocured optical adhesive is no more than about 20%.

11. The optical ferrule assembly of claim 9, wherein the photocured optical adhesive comprises a urethane (meth) acrylate polymer, at least 98% of all non-aromatic carbon-carbon bonds of the urethane (meth)acrylate polymer being single bonds.

12. The optical ferrule assembly of claim 11, wherein the photocured optical adhesive comprises a reaction product of an adhesive formulation comprising:

one or more (meth)acrylate monomers or oligomers;

one or more photoinitiators at 1.5 to 7 weight percent based on a total weight of the adhesive formulation; and one or more aliphatic urethane (meth)acrylate cross-linkers at 25 to 65 weight percent based on the total weight of the adhesive formulation.

13. The optical ferrule assembly of claim 11, wherein the urethane (meth)acrylate polymer comprises one or more of polycarbonate groups, polycaprolactone groups, or polyether groups.

14. An optical ferrule assembly comprising:

an optical ferrule comprising an attachment area and a light input surface;

an optical fiber secured to the attachment area and comprising a fiber end, the light input surface and the fiber end defining a gap therebetween; and a photocured optical adhesive substantially filling the gap and adhering to the light input surface and the fiber end, such that when the optical ferrule assembly mates with a mating optical ferrule assembly that includes a mating optical fiber attached to a mating attachment area and the photocured optical adhesive substantially filling a mating gap between a mating fiber end of the mating optical fiber and a mating light input surface and adhering to the mating light input surface and the mating fiber end to form a mated optical assembly, light propagating along the optical fiber and having a peak intensity $I1 \geq 0.35$ GW/m$^2$ and at least a wavelength in a range of about 850 nm to about 1350 nm, the mated optical assembly has a first insertion loss, and after at least 600 hours of aging of the mated optical assembly at a temperature of at least 40 degrees C., the mated optical assembly has a second insertion loss different from the first insertion loss by no more than about 0.3 dB.

15. The optical ferrule of claim 14, wherein the peak intensity I1 is about 0.7 GW/m$^2$, the wavelength is about 1310 nm, and after 600 hours of aging of the optical ferrule assembly at a temperature of 60 degrees C., the second insertion loss is different from the first insertion loss by no more than about 0.25 dB.

16. The optical ferrule assembly of claim 14, wherein I1≥1 GW/m$^2$, and after at least 380 hours of aging of the mated optical assembly at a temperature of at least 20 degrees C., the mated optical assembly has an insertion loss different from the first insertion loss by no more than 0.08 dB.

17. The optical ferrule assembly of claim 14, wherein the photocured optical adhesive comprises a urethane (meth)

acrylate polymer, at least 98% of all non-aromatic carbon-carbon bonds of the urethane (meth)acrylate polymer being single bonds.

18. The optical ferrule assembly of claim 17, wherein the photocured optical adhesive comprises a reaction product of an adhesive formulation comprising:

one or more (meth)acrylate monomers or oligomers;

one or more photoinitiators at 1.5 to 7 weight percent based on a total weight of the adhesive formulation; and one or more aliphatic urethane (meth)acrylate cross-linkers at 25 to 65 weight percent based on the total weight of the adhesive formulation.

19. The optical ferrule assembly of claim 17, wherein the urethane (meth)acrylate polymer comprises one or more of polycarbonate groups, polycaprolactone groups, or polyether groups.

* * * * *